Aug. 24, 1943.　　T. A. GROSSE　　2,327,420
DISPENSING CONTAINER
Filed March 9, 1942
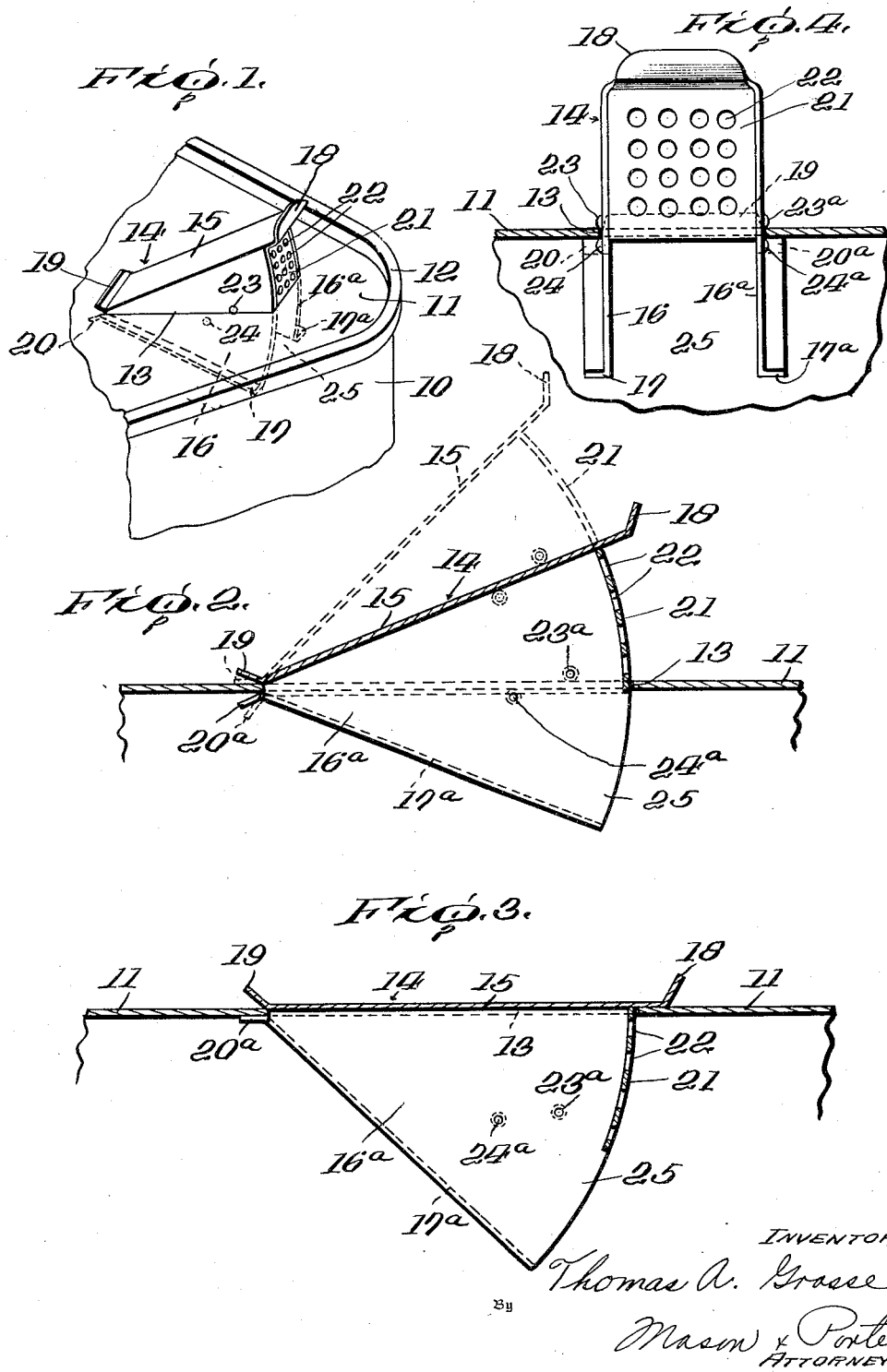
INVENTOR
Thomas A. Grosse
By
Mason & Porter
ATTORNEYS Patented Aug. 24, 1943

2,327,420

UNITED STATES PATENT OFFICE 2,327,420

DISPENSING CONTAINER

Thomas A. Grosse, Chicago, Ill., assignor to Continental Can Company, Inc., New York, N. Y., a corporation of New York Application March 9, 1942, Serial No. 433,974

3 Claims. (Cl. 221—11)

The present invention relates to new and useful improvements in containers, and more particularly to improvements in a dispensing container.

According to the present invention, the container is one which is particularly adapted for holding and dispensing powdered, granular, pulverized or like materials. The body portion of the container may be of any desired shape and is provided with an opening which is controlled by a closure member. More specifically, the opening may be provided in the end wall of the body portion and a closure member is hinged with respect to this end wall for controlling the opening therethrough and thus controlling dispensing of the contents of the container.

An object of the present invention is to provide a container of the above type wherein selective positioning of the closure member permits the contents of the container to be sifted or poured, as desired.

Another object of the invention is to provide a container of the above type wherein the closure member is of a unitary construction having a depending wall portion formed with sifting openings and a pouring opening so that the contents of the container may be poured or sifted depending upon the extent to which the closure member is opened.

A further object of the invention is to provide a container of the above type wherein initial opening of the closure member will expose the sifting openings and further opening movement of the closure member will expose the pouring opening.

A still further object of the invention is to provide a container of the above type wherein stop means are provided for initially locating the closure member in a position permitting sifting of the contents of the container.

The invention still further aims to provide a container of the above type which is extremely simple in construction and which is inexpensive to manufacture and thoroughly efficient in use.

The above and other objects of the invention will in part be obvious and will be hereinafter more fully pointed out.

In the accompanying drawing:

Figure 1 is a fragmentary perspective view showing the closure member in a position permitting sifting of the contents of the container.

Figure 2 is an enlarged fragmentary sectional view, taken longitudinally of the closure member, and showing the closure member in full lines for sifting the contents of the container and in dotted line for pouring the contents of the container.

Figure 3 is a sectional view similar to Figure 2 but showing the closure member in a closed position.

Figure 4 is a fragmentary end view showing the closure member in its intermediate position for sifting the contents of the container.

Referring more in detail to the accompanying drawing, the container is illustrated as including a body portion 10 and a top end 11 which is secured to the body portion by a double seam 12 or the like. The container may be made of any suitable material and may be also formed in any desired shape. The end 11 is provided with a substantially rectangular opening 13 through which the contents of the container may be dispensed.

The opening 13 is controlled by a closure member 14 which is provided with a top imperforate closing wall 15 and depending side walls 16, 16a which extend into the interior of the container. The depending side walls 16, 16a are substantially triangular in shape with the leading edges thereof arcuate in form. The bottom edges of the side walls 16, 16a are provided with outwardly directed flanges 17, 17a, respectively, and these flanges serve to limit outward movement of the closure member by engaging the under surface of the end 11.

The closing wall portion 15 of the closure member is provided with an upwardly inclined finger gripping portion 18 at the free end thereof and with an upwardly inclined portion 19 at the hinged end thereof. Similarly, the flanges 17, 17a are extended beyond the apex of the side walls 16, 16a, respectively, and are bent downwardly with respect to the flanges and thus provide lugs 20, 20a, respectively. Thus, the inclined portion 19 and the lugs 20, 20a form a V-shaped recess into which the adjacent edge of the end 11 extends in order to provide a hinge or pivot point for the closure member.

An end wall portion 21 is disposed between the outer arcuate edges of the side walls 16, 16a and this wall portion is provided with a plurality of sifting openings 22. The wall portion 21 extends approximately midway of the arcuate edges of the side walls. The depending side walls are each provided with a pair of outwardly extending lugs 23, 23a, 24, 24a. The lugs 23, 23a are disposed above the lugs 24, 24a which are spaced inwardly toward the hinge connection. These lugs are disposed so that the lugs 23, 23a engage the outer surface of the end 11 and the lugs 24, 24a engage the under surface of the end 11 when the closure member is in its sifting position, as shown in Figure 2. These lugs thus serve as stop means for locating and maintaining the closure member in a sifting position. The side walls 16, 16a do not have any end wall below the wall portion 21 and the side walls are slightly resilient so as to frictionally engage the container end 11 along the longitudinal sides of the opening 13 therethrough. Thus, when the closure member is shifted to its extreme outer position, a pouring opening 25 is exposed and this pouring opening is defined merely by the edges of the side walls 16, 16a.

When the closure member is in a closed or sealing position, as in Figure 3, the top wall portion 15 serves to close the opening 13 and the lugs 20, 20a engage the under surface of the end 11. A suitable sticker may be placed over the closure member so as to facilitate shipping of the container. When it is desired to sift the contents of the container, the sticker may be removed and the closure member elevated to the full line position of Figure 2 by engaging the finger grip 18. In this position of the closure member, the lugs in the side walls of the container engage the outer and under surfaces of the end 11 so as to position the closure member with only the openings 22 in the wall portion 21 exposed for sifting. When it is desired to pour the contents in bulk, the closure member may be shifted to the dotted line position of Figure 2 wherein the inclined portion 19 will engage the outer surface of the end 11 and the flanges 17, 17a will engage the under surface of the end 11. In this position of the closure member, the contents of the container may be poured in bulk through the opening 25.

While one form of the invention has been shown for purposes of illustration, it is to be clearly understood that various changes in the details of construction and arrangement of parts may be made without departing from the scope of the invention as set forth in the appended claims.

I claim:

1. A dispensing container adapted to permit pouring or sifting of the contents thereof and comprising a body portion having a substantially rectangular opening therethrough, a closure member hingedly connected to the body portion at one end of the said opening and having an imperforate outer wall portion adapted to close the opening, said closure member having depending side walls and an end wall remote from the hinge connection, and said end wall being provided with sifting openings adjacent the imperforate wall portion and a pouring opening disposed inwardly thereof whereby initial opening movement of the closure member will expose only the sifting openings and further opening of the closure member will expose the pouring opening.

2. A dispensing container adapted to permit pouring or sifting of the contents thereof and comprising a body portion having a substantially rectangular opening therethrough, a closure member hingedly connected to the body portion at one end of the said opening and having an imperforate outer wall portion adapted to close the opening, said closure member having depending side walls and an end wall remote from the hinge connection, said end wall being provided with sifting openings adjacent the imperforate wall portion and a pouring opening disposed inwardly thereof whereby initial opening movement of the closure member will expose only the sifting openings and further opening of the closure member will expose the pouring opening, and spaced projections extending outwardly from said depending side walls and located substantially intermediate the ends thereof for engaging the body portion at the sides of the opening therethrough whereby to locate the closure member in a position with only the sifting openings exposed.

3. A dispensing container adapted to permit pouring or sifting of the contents thereof and comprising a body portion having secured thereto an end provided with a substantially rectangular opening therethrough, a closure member including an imperforate outer wall portion for closing the said opening and having depending side walls and an end wall extending through the said opening and into the interior of the container, said end wall having sifting openings therethrough and extending from one end of said imperforate wall portion to a point intermediate the ends of said depending side walls whereby the space remaining between the edges of the side walls affords a pouring opening, said depending side walls being substantially triangular in shape and inclined toward the opposite end of said imperforate wall portion and having outwardly directed flanges for limiting outward movement of the closure member, the ends of said flanges adjacent the imperforate wall portion being extended and bent inwardly of the container, and an outwardly directed flange portion at the adjacent end of said imperforate outer wall portion and forming with the extended ends of said flanges a V-shaped recess providing a hinge connection with the adjacent edge of the container end at the opening therethrough.

THOMAS A. GROSSE.